US012602149B2

(12) United States Patent　　(10) Patent No.: US 12,602,149 B2
Kojima　　(45) Date of Patent: Apr. 14, 2026

(54) DISPLAY CONTROL BASED ON DIRECTIONAL VIDEO FLOW ANGLE

(71) Applicant: TOYOTA JIDOSHA KABUSHIKI KAISHA, Toyota (JP)

(72) Inventor: Motohiro Kojima, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/492,931

(22) Filed: Oct. 24, 2023

(65) Prior Publication Data

US 2024/0241629 A1　　Jul. 18, 2024

(30) Foreign Application Priority Data

Jan. 16, 2023　(JP) ................................. 2023-004721

(51) Int. Cl.
*G06F 3/01*　　　(2006.01)
*G06F 3/04845*　(2022.01)

(52) U.S. Cl.
CPC .......... *G06F 3/04845* (2013.01); *G06F 3/013* (2013.01)

(58) Field of Classification Search
CPC .............................. G06F 3/04845; G06F 3/013
See application file for complete search history.

(56) References Cited

U.S. PATENT DOCUMENTS

2007/0282488 A1* 12/2007 Kato ................ H04N 21/44218
701/1
2015/0277556 A1* 10/2015 Hayashida .............. G06F 3/013
382/103
2017/0123203 A1　　5/2017 Klabukov et al.
2017/0352129 A1* 12/2017 Fu ........................... B60K 35/60
2019/0219824 A1* 7/2019 Shinohara ............... G06F 3/011
2019/0289285 A1* 9/2019 Nashida ............... H04N 13/366
2020/0150444 A1* 5/2020 Nohara ................... G09G 5/36
2021/0034151 A1* 2/2021 Uchida ............... H04N 23/632

FOREIGN PATENT DOCUMENTS

| JP | 2010-009491 A | 1/2010 |
| JP | 2017-531212 A | 10/2017 |
| JP | 2019-015936 A | 1/2019 |
| JP | 2019-018841 A | 2/2019 |
| JP | 2021-160379 A | 10/2021 |
| WO | 2016/014712 A1 | 1/2016 |

OTHER PUBLICATIONS

Hiroyasu Ujike, "Visually Induced Motion Sickness", The Journal of the Institute of Image Information and Television Engineers, vol. 61, No. 8, pp. 1122-1124 (2007).

* cited by examiner

*Primary Examiner* — Rinna Yi

(74) *Attorney, Agent, or Firm* — SoraIP, Inc.

(57) ABSTRACT

The display control device includes a displacement amount detection unit that detects a relative displacement amount between the position of the user's eye viewing the display area of the display unit and the position of the display unit, and a display control unit that performs control to move the display position of the image in the display area to the position of the user's eyes based on the relative displacement amount detected by the displacement amount detection unit.

4 Claims, 5 Drawing Sheets

DISPLAY CONTROL BASED ON DIRECTIONAL VIDEO FLOW ANGLE

CROSS-REFERENCE TO RELATED APPLICATION

This application claims priority to Japanese Patent Application No. 2023-004721 filed on Jan. 16, 2023, incorporated herein by reference in its entirety.

BACKGROUND

1. Technical Field

The present disclosure relates to a display control device, a display control method, and a storage medium.

2. Description of Related Art

Japanese Unexamined Patent Application Publication No. 2021-160379 (JP 2021-160379 A) discloses a moving body window portion control method capable of suppressing motion sickness of an occupant of a moving body. In the technique described in JP 2021-160379 A, a flow speed of a scenery included in a video visible to an occupant through a window portion is calculated, and a transmission rate of a shaded range of the window portion including the scenery of which flow speed is equal to or higher than a predetermined value, is controlled to be lower than a transmission rate when the flow speed is less than the predetermined value.

SUMMARY

On the other hand, in the future, the types of an in-vehicle display and a mobile display device such as a smartphone terminal and a tablet terminal are expected to increase, and, in a moving situation by a moving body such as a vehicle, an autonomous driving vehicle, and a train, use of the display device described above by a user in the moving body is expected to increase. When the user uses a display device in the moving body, flow of a video may occur in the display device due to displacement of the display device relative to the user's eye. Therefore, it is required to suppress visually induced motion sickness of the user caused by the flow of the video. The technique described in JP 2021-160379 A is not compatible with the use of the display device inside the moving body.

In consideration of the above facts, it is an object of the present disclosure to provide a display control device, a display control method, and a storage medium capable of suppressing visually induced motion sickness of a user when the user uses a display device in a moving body.

A display control device according to the present disclosure described in at least one embodiment includes: a displacement amount detection unit that detects, at a predetermined timing, an amount of relative displacement between a position of an user's eye viewing a display area of a display unit and a position of the display unit; and a display control unit that performs control to move a display position of a video in the display area to a side of the position of the user's eye, based on the amount of relative displacement detected by the displacement amount detection unit.

In the display control device according to the present disclosure described in at least one embodiment, the amount of relative displacement between the position of the user's eye viewing the display area of the display unit and the position of the display unit is detected at the predetermined timing, and the control is performed to move the display position of the video in the display area to the side of the position of the user's eye, based on the detected amount of relative displacement. Therefore, since the display position of the video in the display area is moved to the side of the position of the user's eye, the speed of the flow of the video can be made slower than when the display position is not moved, and visually induced motion sickness caused by the speed of the flow of the video can be alleviated. As a result, it is possible to suppress the visually induced motion sickness of the user when the user uses the display device in the moving body.

In the display control device according to the present disclosure described in at least one embodiment, in the configuration according to claim 1, the display control unit performs control to make a video flow angle of the video in the display area smaller.

In the display control device according to the present disclosure described in at least one embodiment, the control is performed to make the video flow angle of the video in the display area smaller. Therefore, as the video flow angle becomes smaller, the speed of the flow of the video can be made slower, so that the visually induced motion sickness caused by the speed of the flow of the video can be alleviated.

In the display control device according to the present disclosure described in at least one embodiment, the displacement amount detection unit is mounted on a vehicle and detects the amount of relative displacement based on information including behavior information detected by a sensor that detects behavior of the vehicle.

In the display control device according to the present disclosure described in at least one embodiment, the displacement amount detection unit is mounted on the vehicle and detects the amount of relative displacement based on the information including the behavior information detected by the sensor that detects the behavior of the vehicle. Therefore, since the display position of the video in the display area can be controlled in accordance with the behavior of the vehicle, it is possible to suppress the visually induced motion sickness of the user when the user uses the display device in the vehicle.

A display control method according to the present disclosure described in at least one embodiment includes: detecting, at a predetermined timing, an amount of relative displacement between a position of an user's eye viewing a display area of a display unit and a position of the display unit; and performing control to move a display position of a video in the display area to a side of the position of the user's eye, based on the detected amount of relative displacement.

According to the display control method according to the present disclosure described in at least one embodiment, the mount of relative displacement between the position of the user's eye viewing the display area of the display unit and the position of the display unit is detected at the predetermined timing, and control is performed to move the display position of the video in the display area to the side of the position of the user's eye, based on the detected amount of relative displacement. Therefore, since the display position of the video in the display area is moved to the side of the position of the user's eye, the speed of the flow of the video can be made slower than when the display position is not moved, and the visually induced motion sickness caused by the speed of the flow of the video can be alleviated. As a result, it is possible to suppress the visually induced motion sickness of the user when the user uses the display device in the moving body.

A storage medium according to the present disclosure described in at least one embodiment stores a display control program that causes a computer to function as: a detection unit that detects, at a predetermined timing, an amount of relative displacement between a position of an user's eye viewing a display area of a display unit and a position of the display unit; and a display control unit that performs control to move a display position of a video in the display area to a side of the position of the user's eye, based on the amount of relative displacement detected by the detection unit.

The storage medium according to the present disclosure described in at least one embodiment stores the display control program that causes the computer to function as: the detection unit that detects, at the predetermined timing, the amount of relative displacement between the position of the user's eye viewing the display area of the display unit and the position of the display unit; and the display control unit that performs control to move the display position of the video in the display area to the side of the position of the user's eye, based on the amount of relative displacement detected by the detection unit. Therefore, since the display position of the video in the display area is moved to the side of the position of the user's eye, the speed of the flow of the video can be made slower than when the display position is not moved, and the visually induced motion sickness caused by the speed of the flow of the video can be alleviated. As a result, it is possible to suppress the visually induced motion sickness of the user when the user uses the display device in the moving body.

As described above, the display control device, the display control method, and the storage medium according to the present disclosure have the excellent effect of suppressing the visually induced motion sickness of the user when the user uses the display device in the moving body.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
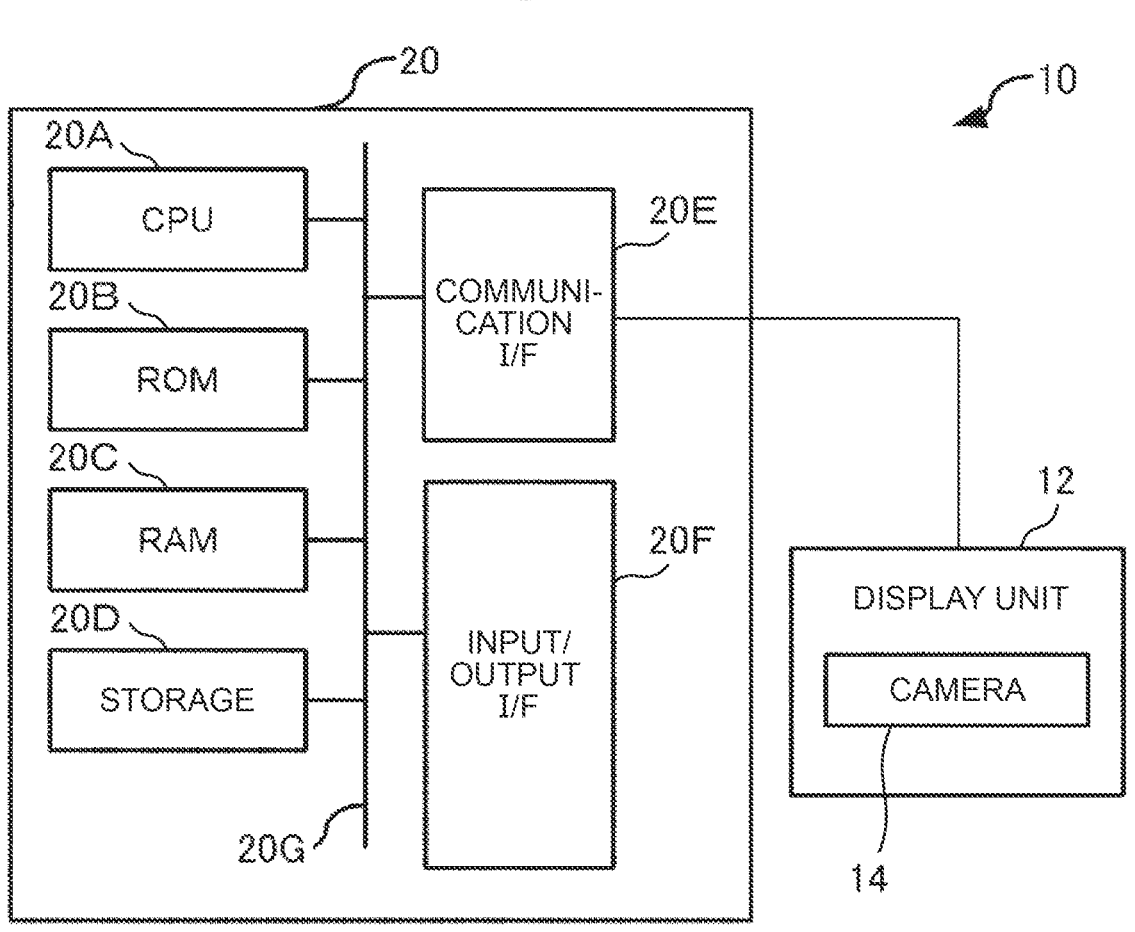
FIG. 1 is a block diagram showing the hardware configuration of a vehicle system including a display control device according to the first embodiment of the present disclosure.

A vehicle system 10 including a display control Electronic Control Unit (ECU) 20 as a display control device according to the first embodiment of the present disclosure will be described below with reference to the accompanying drawings. A vehicle system 10 of the present embodiment is installed in a vehicle (not shown) capable of at least one of autonomous driving and manual operation, and includes a display control ECU 20 and a display unit 12 as shown in FIG. 1.

The display unit 12 is composed of a mobile display device such as a smartphone terminal and a tablet terminal, and is brought into the vehicle. The display unit 12 has a display area 12A (see FIG. 3) on which an image is displayed. Further, in this embodiment, the display unit 12 is provided with a camera 14 on the same plane as the display area 12A.

The display control ECU 20 includes a Central Processing Unit (CPU: processor) 20A, a Read Only Memory (ROM) 20B, a Random Access Memory (RAM) 20C, a storage 20D, a communication interface (communication I/F) 20E and an input/output interface (input/output I/F) 20F. Although not shown, the input/output I/F 20F is connected to a photographing unit, a GPS device, a car navigation system, etc., which are mounted on the above-described vehicle and photograph the surroundings of the vehicle. Each configuration uses a known technique and is connected so as to be able to communicate with each other via a bus 20G.

Also, the communication I/F 30E is an interface for the display control ECU 20 to communicate with a server and other devices (not shown). For example, standards such as Ethernet (registered trademark), LTE, FDDI, and Wi-Fi (registered trademark) are used for the communication I/F 30E. In this embodiment, the display control ECU 20 communicates with the display unit 12 via the communication I/F 30E.

Figure 2:
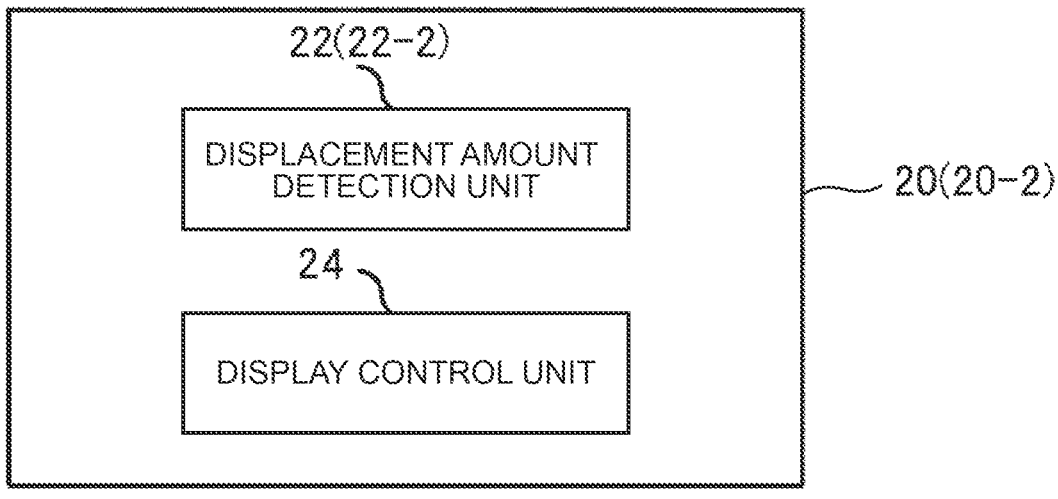
FIG. 2 is a block diagram showing the functional configuration of the vehicle display control device according to the first embodiment of the present disclosure.

The display control ECU 20 implements various functions using the above hardware resources. As shown in FIG. 2, the display control ECU 20 includes a displacement amount detection unit 22 and a display control unit 24 as functional components. Each functional configuration is realized by reading and executing a program stored in the ROM 20B or the storage 20D by the CPU 20A.

The displacement amount detection unit 22 detects the amount of relative displacement between the position of the user's eye E (see FIG. 3) viewing the display area 12A of the display unit 12 and the position of the display unit 12 at a predetermined timing. Note that the predetermined timing may be, for example, a constant interval or a predetermined timing. For example, it may be the case that the behavior of the vehicle is newly detected.

The displacement amount detection unit 22 detects the position of the eye E of the user H (see FIG. 3) using the display unit 12. Specifically, an area including the eye E of the user looking at the display area 12A is photographed by the camera 14 provided in the display unit 12, and the photographed image of the eye E of the user is subjected to pattern recognition, for example, so that the position of the eye E of the user H is detected. Here, the position of the eye E of the user H is detected based on the image captured by the camera 14 provided on the display unit 12, and is therefore a relative position to the position of the display unit 12.

Figure 3:
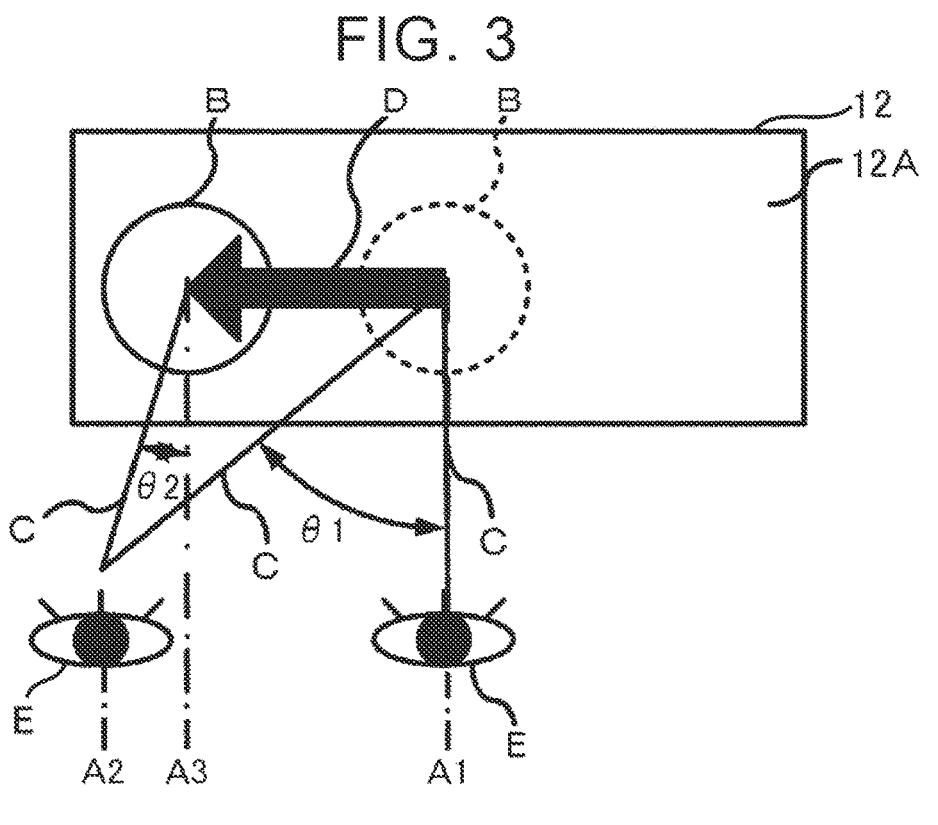
FIG. 3 is a diagram illustrating an example of display control by a display control unit.

As shown in FIG. 3, for example, the position of the eye E detected based on the previously captured image is the position of the dashed-dotted line A1. When this image is captured, the display position of the video B displayed in the display area 12A of the display unit 12 is the position of the dashed-dotted line A1. In FIG. 3, the video B displayed in the display area 12A is shown in a circular shape with dotted lines or solid lines for the sake of easy understanding, but it is actually displayed over the display area 12A.

Similarly, the displacement amount detection unit 22 detects the eye position of the user H at a constant timing. Then, for example, in the case where the vehicle behaves between the above photographing and the next photographing, if the position of the eye E moves relative to the display unit 12, it is detected based on the next photographed image. The position of the eye E is, for example, the position of the dashed-dotted line A2.

For example, if the eye E is positioned on the dashed-dotted line A1 and the center of the video B is also positioned on the dashed-dotted line A1, when the eye E moves to the position of the dashed-dotted line A2, the center of the video B moves. If not, the straight line C connecting the center of the video B and the eye E will move by the angle θ1. Note that in FIG. 3, the user H moves differently from the display unit 12 due to the behavior of the vehicle, and therefore, the amount of displacement of the movement becomes the amount of relative displacement to the display unit 12. In this embodiment, the straight line C rotates clockwise about the center of the video B by an angle θ.

In this embodiment, the angle θ at which the straight line C moves is used as the amount of relative displacement between the position of the eye E of the user H and the position of the display unit 12, and is used as the image flow angle θ of the video B. The displacement amount detection unit 22 detects the image flow angle θ as the relative displacement amount.

In FIG. 3, the eye E of the user H is displayed as a single eye, but in the present embodiment, the displacement amount detection unit 22 detects both eyes E of the user H as an example. That is, the displacement amount detection unit 22 detects the positions of the eyes E of both eyes, and detects the image flow angle θ for each eye E. As an example, the displacement amount detection unit 22 adopts the image flow angle θ of the eye E having the larger value. In this embodiment, the image flow angle θ having the larger value is used, but the present disclosure is not limited to this, and an average value may be used as the image flow angle θ. Alternatively, the displacement amount detection unit 22 may detect the position of one of the right and left eyes E and employ the detected image flow angle θ of the eye E.

The display control unit 24 performs control to move the display position of the video B in the display area 12A toward the position of the eye E of the user H based on the image flow angle θ detected by the displacement amount detection unit 22. Specifically, as shown in FIG. 3, the display control unit 24 moves the video B in the direction of an arrow D (left side in FIG. 3). Note that the arrow D is the same direction as the direction in which the eye E moves from the dashed-dotted line A1 to the dashed-dotted line A2.

In the present embodiment, as an example, the display control unit 24 performs control to make the image flow angle θ of the video B in the display area 12A smaller. Specifically, the display control unit 24 moves the center of the video B in the display area 12A from the dashed-dotted line A1 to the dashed-dotted line A3. When the center of the video B is positioned on the dashed-dotted line A3, the amount of relative displacement between the position of the eye E of the user H and the position of the display unit 12 is the image flow angle θ2. Here, since the position of the eye E of the user H remains on the dashed-dotted line A2, the image flow angle θ2 is smaller than the image flow angle θ1. That is, the display control unit 24 moves the display position of the video B toward the position of the eye E of the user H, thereby decreasing the image flow angle θ and thus reducing the image flow speed.

In this embodiment, the display control unit 24 moves the center of the video B in the display area 12A to the dashed-dotted line A3 as an example, but the present disclosure is not limited to this, and may be moved to the dashed-dotted line A2.

Figure 4:
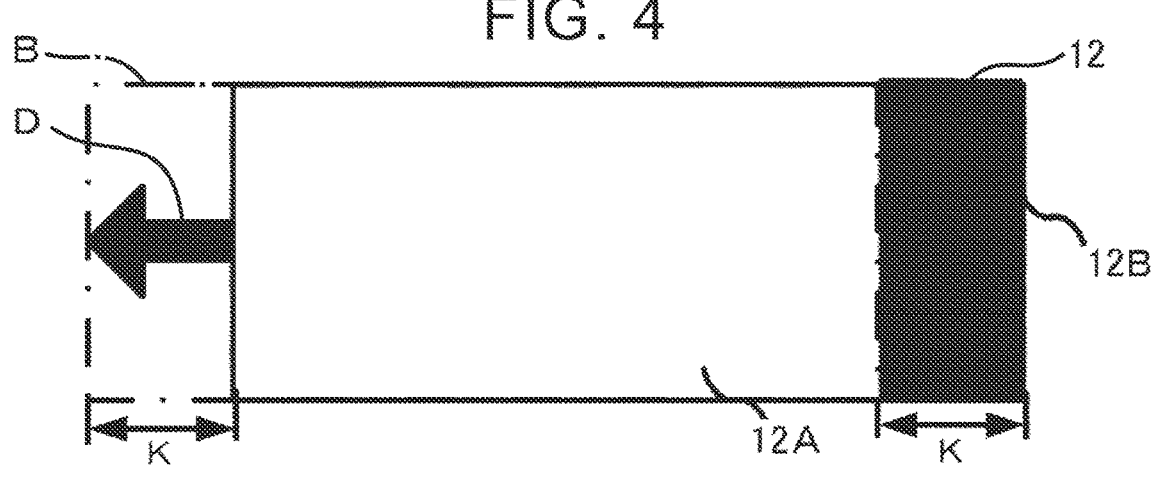
FIG. 4 is a diagram showing an example of movement of the display position of an image.

As shown in FIG. 4, for example, assume that video B is moved in the direction of arrow D by distance K. In this case, the left end portion of the video B in FIG. 4 is not displayed in the display area 12A. Also, the right end of the video B is displayed, but the video B to be displayed does not exist in the display area 12A on the right side of the right end. Therefore, in the present embodiment, the display control unit 24 displays, as an example, a black band portion 12B in which an area in which the video B is not displayed is blacked out. The present disclosure is not limited to this. For example, an interpolated image may be generated and displayed based on the display content of the video B, or may be displayed in a color and display mode other than black.

Figure 5:
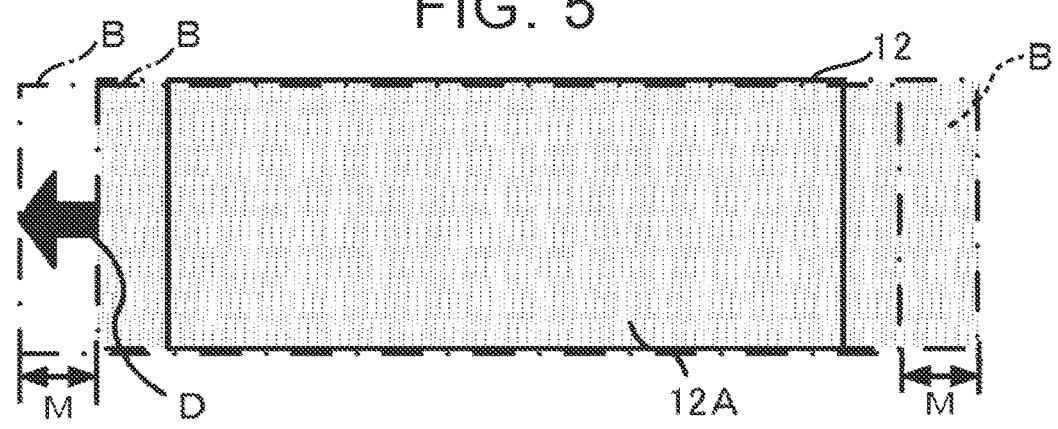
FIG. 5 is a diagram showing another example of movement of the video display position.

Further, as shown in FIG. 5, for example, when the video B has an image area larger than the display area 12A as indicated by hatching, the video B is moved in the direction of the arrow D by the distance M. Also, the video B is displayed on the entire surface of the display area 12A.

As described above, as to the amount of movement of the video B, based on the size of the display area 12A and the size of the image area constituting the video B, etc., the display area of the video B in the display area 12A is set to be larger, while suppressing the visually induced motion sickness of the user H.

Figure 6:
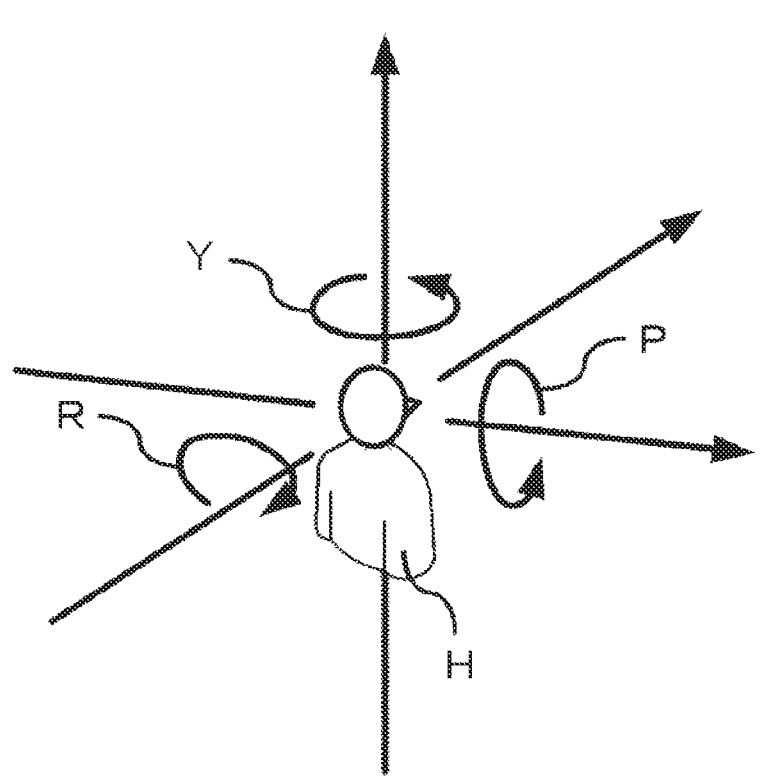
FIG. 6 is an explanatory diagram for explaining the direction of video flow starting from the user.
Figure 7A:
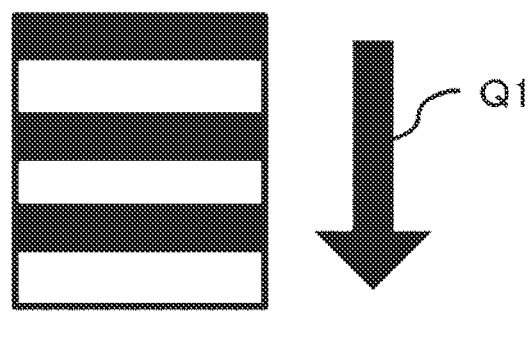
FIG. 7A is a diagram showing an example of the direction of video flow.
Figure 7B:
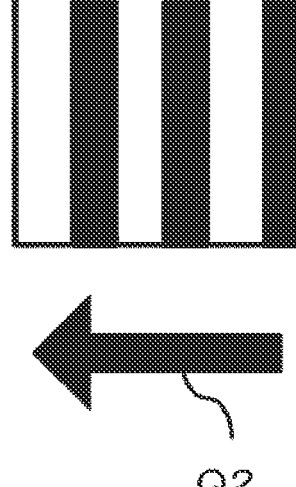
FIG. 7B is a diagram showing another example of the direction of video flow.

Note that FIG. 3 to FIG. 5 describe the horizontal movement of the video B in the display area 12A of the display unit 12 as an example, but in the present embodiment, as shown in FIG. 6, the same processing is performed for the pitch direction (arrow P), roll direction (arrow R), and yaw direction (arrow Y) when the user H is set as the starting point. As shown in FIG. 7A and FIG. 7B, for example, when the vehicle behaves, video B flows in the direction of arrow Q1 in the pitch direction, and flows in the direction of arrow Q2 in the yaw direction. Also, although illustration is omitted, the image flows clockwise in the roll direction.

Specifically, the displacement amount detection unit 22 detects the position of the eye E in each of the pitch direction, the roll direction, and the yaw direction based on the captured image captured by the camera 14, and detects the image flow angle θ. do. Further, the display control unit 24 controls the display position of the video B in the display area 12A as described above based on the image flow angle θ detected in each of the pitch direction, roll direction, and yaw direction.

In this embodiment, the display control unit 24 controls the display position of the video B in each of the pitch direction, roll direction, and yaw direction. However, the present disclosure is not limited to this, and the display control unit 24 may control the display position of the video B in one or two of the pitch direction, the roll direction, and the yaw direction. Further, the display control unit 24 may control the display position of the video B in at least one of the horizontal direction and the vertical direction.

Next, a series of processes executed by the display control ECU 20 will be described using the flowchart shown in FIG. 8. The display control executed by the display control ECU 20 is executed by the CPU 20A reading out a display control program from the ROM 20B or the storage 20D, developing it in the RAM 20C and executing it.

Figure 8:
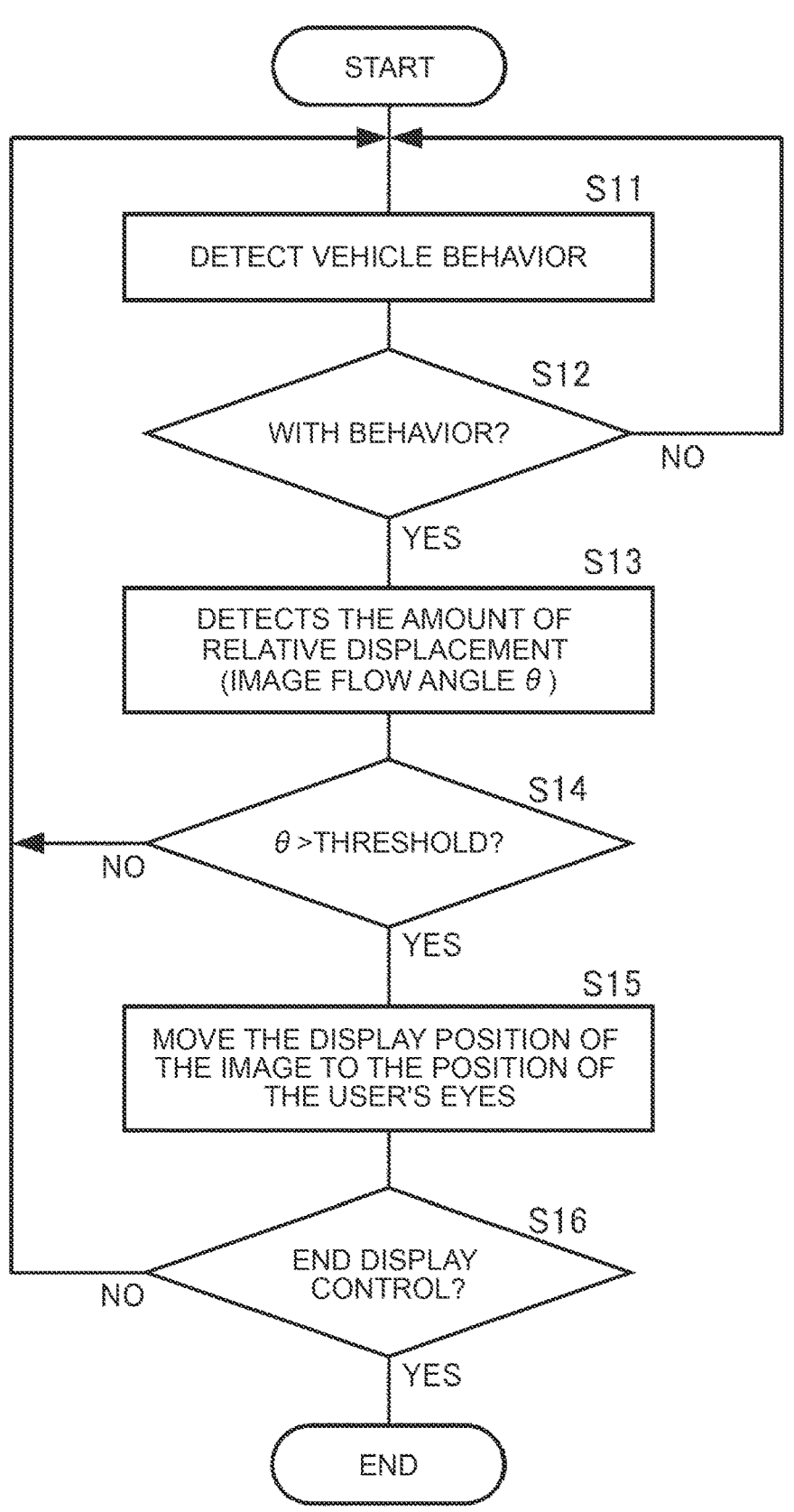
FIG. 8 is a flowchart showing an example of a series of processes of the display control device according to the first embodiment of the present disclosure.
Figure 9:
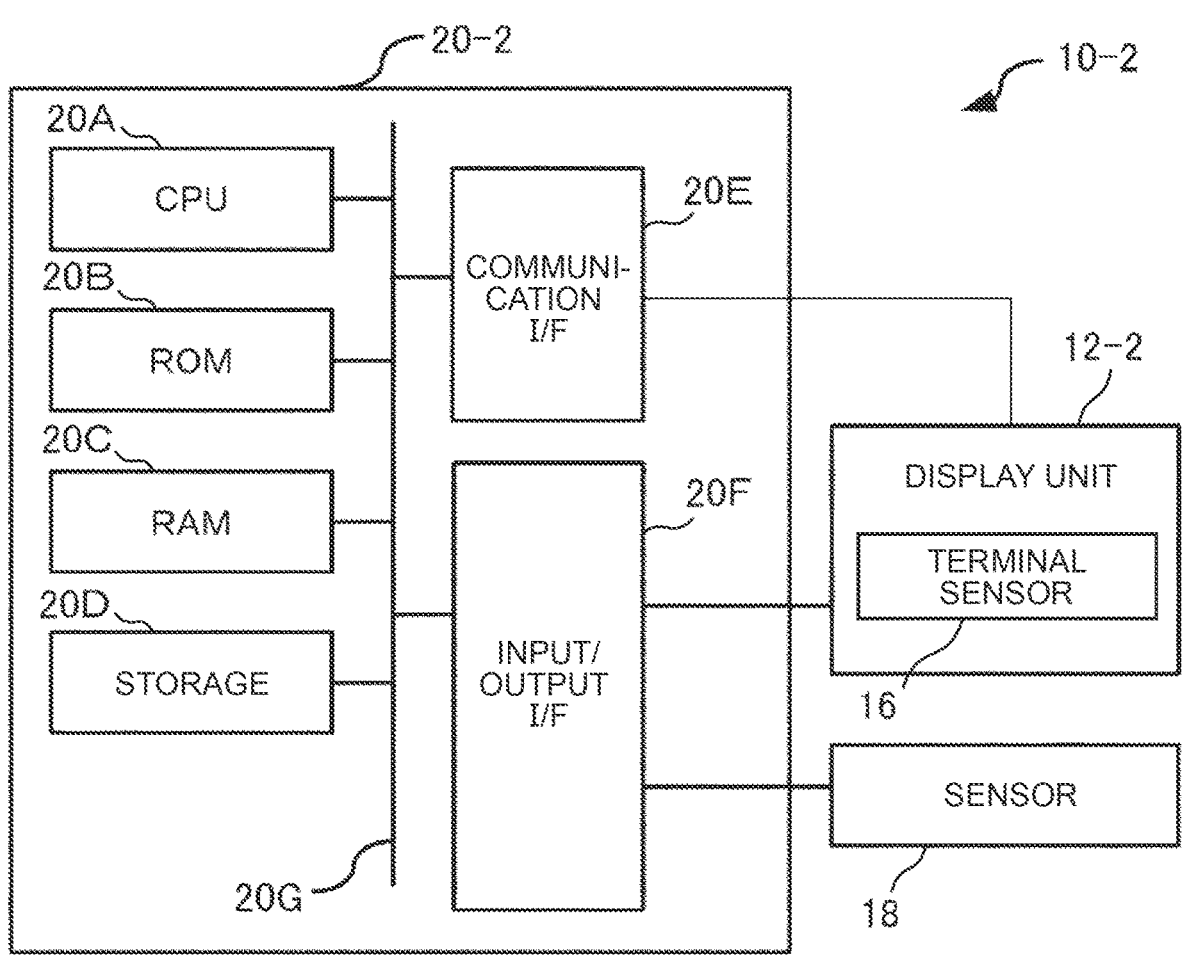
FIG. 9 is a block diagram showing the hardware configuration of a vehicle system including a display control device according to the second embodiment of the disclosure.

As shown in FIG. 8, first in S11, the CPU 20A detects the behavior of the vehicle. Next, in S12, the CPU 20A determines whether or not the behavior of the vehicle has been detected. When the behavior of the vehicle is not detected (S12, NO), the CPU 20A shifts the processing to S11 and continues the processing from S11.

On the other hand, if the behavior of the vehicle is detected in S12 (S12, YES), the displacement amount detection unit 22 detects the amount of relative displacement between the position of the eye E of the user H and the position of the display unit 12 in S13. Specifically, the displacement amount detection unit 22 detects the image flow angle θ in each of the pitch direction, roll direction, and yaw direction as the relative displacement amount as described above.

Next, in S14, the CPU 20A determines whether the image flow angle θ in each of the pitch direction, roll direction, and yaw direction is greater than a predetermined threshold value. It should be noted that motion sickness is related to the video flow velocity, which is the time differential of the video flow angle θ, and the direction in which video B flows. The relationship is disclosed in a known document such as "The Journal of the Institute of Image Information and Television Engineers, Vol. 61, No. 8, pp. 1122-1124 (2007)", for example.

In the present embodiment, the pitch direction, roll direction, and yaw direction are based on the relationship between motion sickness described in these known documents and the image flow velocity, which is the time differential of the image flow angle θ, and the flow direction of the video B. A threshold in each of the directions is set. Then, when the image flow angle θ is greater than the threshold in at least one of the pitch direction, roll direction, and yaw direction, the CPU 20A determines that S14 is affirmative.

In S14, if the image flow angles θ in the pitch direction, roll direction, and yaw direction are equal to or less than the threshold values (S14; NO), the CPU 20A shifts the process to S11 and continues the processes from S11 onwards.

On the other hand, in S14, if the image flow angle θ in at least one of the pitch direction, roll direction, and yaw direction is greater than the threshold value (S14; YES), the display control unit 24 causes the video B to be displayed as described above. The position is moved to the position side of the eye E of the user H.

Next, in S16, the CPU 20A determines whether there is an instruction to end the display control of the display position of the video B by the display control unit 24 or not. In S16, when the CPU 20A determines that there is no instruction to end the display control (S16; NO), the CPU 20A shifts the process to S11 and performs the processes after S11.

On the other hand, when the CPU 20A determines in S16 that there is an instruction to end the display control (S16; YES), the CPU 20A causes the display control unit 24 to end the control of the display position of the video B. In the present embodiment, as an example, when the shift range of the vehicle is set to the parking position, the CPU 20A determines that the vehicle does not behave, and determines that there is an instruction from the display control unit 24 to end the display control of the display position of the video B.

Next, the effects of the first embodiment will be described.

The display control ECU 20 according to the first embodiment detects the amount of relative displacement between the position of the eye E of the user H viewing the display area 12A of the display unit 12 and the position of the display unit 12 at a predetermined timing. Further, control is performed to move the display position of the video B in the display area 12A toward the position of the eye E of the user H based on the detected relative displacement amount, that is, the image flow angle θ. Therefore, since the display position of the video B in the display area 12A is moved toward the position of the eye E of the user H, the image flow angle θ can be made smaller than when the video B is not moved. As a result, the image flow speed can be slowed down, and motion sickness caused by the image flow speed can be reduced. Therefore, it is possible to suppress motion sickness of the user H when using the display unit 12 in the vehicle.

Further, in the display control ECU 20 according to the first embodiment, the display control unit 24 performs control to make the image flow angle θ of the video B in the display area 12A smaller. Therefore, as the image flow angle θ becomes smaller, the speed of the image flow can be made slower, so that motion sickness caused by the speed of the image flow can be reduced.

Next, a vehicle system 10-2 including a display control ECU 20-2 as a display control device according to the second embodiment of the disclosure will be described. In the present embodiment, the same reference numerals are used to denote the same configurations as in the first embodiment, and detailed description thereof will be omitted, and only different configurations will be described.

The display unit 12-2 of this embodiment has a terminal sensor 16. As in the first embodiment, the display unit 12-2 may be further provided with a camera 14. The terminal sensor 16 is a sensor that acquires acceleration information of the display unit 12-2, and has, for example, a triaxial acceleration sensor. The three-axis acceleration sensor detects acceleration in the pitch, roll, and yaw directions (see FIG. 6) and outputs detection signals to the display control ECU 20-2.

A sensor 18 is connected to the input/output I/F 20F. The sensor 18 is a sensor that detects vehicle behavior such as vehicle acceleration information and attitude information. Specifically, the sensor 18 acquires information related to vehicle behavior such as vehicle speed, acceleration, and attitude, that is, behavior information. The sensor 18 according to this embodiment includes, for example, a vehicle speed sensor, an acceleration sensor, and a gyro sensor.

A vehicle speed sensor is a sensor for detecting the speed of a vehicle. The acceleration sensor is a sensor for detecting vehicle acceleration (vehicle longitudinal acceleration in the longitudinal direction of the vehicle, lateral acceleration in the lateral direction of the vehicle, and vertical acceleration in the vertical direction of the vehicle) during acceleration and braking. A gyro sensor is a sensor for detecting the posture of a vehicle, and more specifically detects the angle, angular velocity, or angular acceleration of the vehicle. Each information detected by the sensor 18 is output to the display control ECU 20-2. Note that the sensor 18 may be composed of, for example, a 6-axis inertial sensor mounted on a vehicle. The 6-axis inertial sensor detects accelerations in the longitudinal, lateral, and vertical directions (see FIG. 6), and angular velocities in the longitudinal, lateral, and vertical directions.

The displacement amount detection unit 22-2 (see FIG. 2) of the present embodiment is based on the vehicle behavior detected by the sensor 18 and the acceleration information and posture information detected by the terminal sensor 16 of the display unit 12-2. Then, the amount of relative displacement between the vehicle and the display unit 12-2 is calculated. Specifically, it can be calculated by using a known technique for matching the coordinate systems of the vehicle and the display unit 12-2.

In this embodiment, as an example, it is estimated that the behavior of the vehicle and the movement of the user H riding in the vehicle are substantially the same. Therefore, the amount of relative displacement between the vehicle and the display unit 12-2 is the amount of relative displacement between the position of the eye E of the user H and the position of the display unit 12-2, and the mount of relative displacement is the video flow angel θ of the video B.

The displacement amount detection unit 22-2 detects the position and display of the eye E of the user H based on information acquired by the terminal sensor 16 and the sensor 18 instead of the captured image captured by the camera 14 as in the above embodiment. A relative displacement amount with respect to the position of the display unit 12-2, that is, the image flow angle θ is detected.

The display control unit 24 of this embodiment controls the display position of the video B in the display area 12A based on the relative displacement amount detected by the displacement amount detection unit 22-2, that is, the image flow angle θ.

In the display control ECU 20-2 of the second embodiment, the same effects as those of the first embodiment can be obtained.

Further, in the display control ECU 20-2 of the second embodiment, the displacement amount detection unit 22-2 is mounted on the vehicle, and based on the behavior information detected by the sensor 18 for detecting the behavior of the vehicle, the relative displacement amount, i.e. the image flow angle θ is detected. Therefore, since the display position of the video B in the display area 12A can be controlled according to the behavior of the vehicle, it is possible to suppress visual sickness of the user when using the display unit 12-2 in the vehicle.

Although the camera 14 mounted on the display unit 12 is used to detect the position of the eye E of the user H in the first embodiment, the present disclosure is not limited to this. For example, the position of the user's eye E may be detected by a vehicle-mounted camera (not shown). In this case, the camera mounted on the vehicle, that is, the amount of relative displacement between the vehicle and the display unit 12 can be detected using the sensor 18 and the terminal sensor 16 of the second embodiment.

Further, in the above-described embodiment, the display control ECU 20 as a display control device is installed in a vehicle as an example of a moving body, but the present disclosure is not limited to vehicles. For example, the display control device of the present disclosure may be mounted on a vehicle such as a ship or an airplane. In this case, a display unit as a display device (display terminal) is brought into the vehicle.

Further, the processing performed by each part of the display control ECUs 20, 20-2 in the above-described embodiments has been described as software processing performed by executing the display control program, but the present disclosure is not limited to this. For example, the processing may be performed by hardware. Alternatively, the processing may be a combination of both software and hardware. In the case of software processing, the program may be stored in various storage media and distributed. Also, the program may be downloaded from an external device via a network.

Although one embodiment of the present disclosure has been described above, the present disclosure is not limited to such an embodiment. It goes without saying that various aspects can be implemented without departing from the scope.

What is claimed is:

1. A display control device mounted on a vehicle comprising:

a processor configured to:

detect, at a predetermined timing, an amount of relative displacement between a position of a user's eye viewing a display area of a display unit and a position of the display unit, wherein the amount of relative displacement based on information including behavior information of the vehicle detected by a sensor;

calculate, based on the amount of relative displacement, a video flow angle in each of a pitch direction, a roll direction, and a yaw direction with reference to the user as a starting point;

determine whether the video flow angle in at least one of the pitch direction, the roll direction, and the yaw direction exceeds a predetermined threshold value; and perform control to move a display position of a video in the display area to a side of the position of the user's eye and to decrease the video flow angle for reducing the speed of the video flow, based on the amount of relative displacement, only when the processor determines that the video flow angle in at least one of the directions exceeds the predetermined threshold value.

2. The display control device according to claim 1, wherein the behavior of the vehicle includes vehicle speed, acceleration, and attitude.

3. A display control method comprising:

detecting, at a predetermined timing, an amount of relative displacement between a position of a user's eye viewing a display area of a display unit mounted on a vehicle and a position of the display unit, wherein the amount of relative displacement based on information including behavior information of the vehicle detected by a sensor;

calculating, based on the amount of relative displacement, a video flow angle in each of a pitch direction, a roll direction, and a yaw direction with reference to the user as a starting point;

determining whether the video flow angle in at least one of the pitch direction, the roll direction, and the yaw direction exceeds a predetermined threshold value; and performing control to move a display position of a video in the display area to a side of the position of the user's eye and decreasing the video flow angle for reducing the speed of the video flow, based on the detected amount of relative displacement, only when the processor determines that the video flow angle in at least one of the directions exceeds the predetermined threshold value.

4. A non-transitory storage medium storing a display control program that causes a computer to execute a process comprising:

detecting, at a predetermined timing, an amount of relative displacement between a position of a user's eye viewing a display area of a display unit mounted on a vehicle and a position of the display unit, wherein the amount of relative displacement based on information including behavior information of the vehicle detected by a sensor;

calculating, based on the amount of relative displacement, a video flow angle in each of a pitch direction, a roll direction, and a yaw direction with reference to the user as a starting point;

determining whether the video flow angle in at least one of the pitch direction, the roll direction, and the yaw direction exceeds a predetermined threshold value; and performing control to move a display position of a video in the display area to a side of the position of the user's eye and decreasing the video flow angle for reducing the speed of the video flow, based on the amount of relative displacement, only when the processor determines that the video flow angle in at least one of the directions exceeds the predetermined threshold value.

* * * * *